US012168223B2

(12) United States Patent
Gascon et al.

(10) Patent No.: US 12,168,223 B2
(45) Date of Patent: Dec. 17, 2024

(54) METAL CARBIDE BASED CATALYST AND METHOD OF MAKING

(71) Applicants: KING ABDULLAH UNIVERSITY OF SCIENCE AND TECHNOLOGY, Thuwal (SA); SAUDI ARABIAN OIL COMPANY, Dhahran (SA)

(72) Inventors: Jorge Gascon, Thuwal (SA); Tuiana B. Shoinkhorova, Thuwal (SA); Alla Dikhtiarenko, Thuwal (SA); Mohammed Alabdullah, Thuwal (SA); Alberto Rodriguez Gomez, Thuwal (SA); Jullian Vittenet, Thuwal (SA); Isidoro Morales Osorio, Thuwal (SA); Ola Ali, Thuwal (SA); Wei Xu, Thuwal (SA)

(73) Assignees: KING ABDULLAH UNIVERSITY OF SCIENCE AND TECHNOLOGY, Thuwal (SA); SAUDI ARABIAN OIL COMPANY, Dhahran (SA)

(*) Notice: Subject to any disclaimer, the term of this patent is extended or adjusted under 35 U.S.C. 154(b) by 327 days.

(21) Appl. No.: 17/630,786

(22) PCT Filed: Jul. 28, 2020

(86) PCT No.: PCT/IB2020/057120
§ 371 (c)(1),
(2) Date: Jan. 27, 2022

(87) PCT Pub. No.: WO2021/019445
PCT Pub. Date: Feb. 4, 2021

(65) Prior Publication Data
US 2022/0266229 A1 Aug. 25, 2022

Related U.S. Application Data

(60) Provisional application No. 62/881,553, filed on Aug. 1, 2019.

(51) Int. Cl.
*B01J 29/80* (2006.01)
*B01J 21/16* (2006.01)
(Continued)

(52) U.S. Cl.
CPC .............. *B01J 29/80* (2013.01); *B01J 21/16* (2013.01); *B01J 27/22* (2013.01); *B01J 27/224* (2013.01);
(Continued)

(58) Field of Classification Search
CPC ... B01J 29/80; B01J 21/16; B01J 27/22; B01J 27/224; B01J 29/084; B01J 29/70;
(Continued)

(56) References Cited

U.S. PATENT DOCUMENTS 3,520,656 A * 7/1970 Meadows ............. C01B 32/956
501/87
5,888,378 A 3/1999 Kowalski
(Continued)

FOREIGN PATENT DOCUMENTS

CN 102631945 A 8/2012
CN 103813856 A 5/2014
(Continued)

OTHER PUBLICATIONS

First Office Action in corresponding/related Chinese Patent Application No. 202080062934.1, dated Jun. 16, 2023.
(Continued)

*Primary Examiner* — Randy Boyer
*Assistant Examiner* — Juan C Valencia
(74) *Attorney, Agent, or Firm* — PATENT PORTFOLIO BUILDERS PLLC

(57) ABSTRACT

A method for making a metal carbide based catalyst for crude oil cracking includes mixing a clay with a phosphorous based stabilizer material to obtain a liquid slurry;
(Continued)

adding an aluminosilicate zeolite and an ultrastable Y zeolite to the liquid slurry; adding $Al_2Cl(OH)_5$ to the liquid slurry; adding metal carbide particles, having a given diameter, to the liquid slurry to obtain a mixture; and spray drying the mixture to obtain the metal carbide based catalyst. The metal carbide particles are coated with the aluminosilicate zeolite and the ultrastable Y zeolite.

20 Claims, 16 Drawing Sheets

(51) Int. Cl.
| | | |
|---|---|---|
| | *B01J 27/22* | (2006.01) |
| | *B01J 27/224* | (2006.01) |
| | *B01J 29/06* | (2006.01) |
| | *B01J 29/08* | (2006.01) |
| | *B01J 29/70* | (2006.01) |
| | *B01J 35/23* | (2024.01) |
| | *B01J 35/50* | (2024.01) |
| | *B01J 37/00* | (2006.01) |
| | *B01J 37/02* | (2006.01) |
| | *B01J 37/04* | (2006.01) |
| | *C10G 11/05* | (2006.01) |

(52) U.S. Cl.
CPC .............. *B01J 29/084* (2013.01); *B01J 29/70* (2013.01); *B01J 35/23* (2024.01); *B01J 35/50* (2024.01); *B01J 37/0036* (2013.01); *B01J 37/0045* (2013.01); *B01J 37/0221* (2013.01); *B01J 37/04* (2013.01); *C10G 11/05* (2013.01); *B01J 2029/062* (2013.01)

(58) Field of Classification Search
CPC ........ B01J 35/23; B01J 35/50; B01J 37/0036; B01J 37/0045; B01J 37/0221; B01J 37/04; B01J 2029/062; B01J 27/14; B01J 27/228; B01J 29/40; B01J 37/0246; C10G 11/05

See application file for complete search history.

(56) References Cited

U.S. PATENT DOCUMENTS

| | | |
|---|---|---|
| 2005/0182278 A1 | 8/2005 | Canos et al. |
| 2010/0010272 A1 | 1/2010 | Ivanova et al. |
| 2013/0023710 A1* | 1/2013 | Ravichandran ........ C10G 11/18 585/653 |
| 2013/0098804 A1 | 4/2013 | Chang et al. |
| 2013/0144089 A1 | 6/2013 | Fjare et al. |
| 2014/0206526 A1 | 7/2014 | Gao et al. |
| 2018/0237702 A1 | 8/2018 | Akah et al. |
| 2018/0319717 A1 | 11/2018 | Sangar et al. |

FOREIGN PATENT DOCUMENTS

| | | |
|---|---|---|
| WO | 9841595 A1 | 9/1998 |
| WO | 2018156427 A1 | 8/2018 |

OTHER PUBLICATIONS

Search Report in corresponding/related Chinese Patent Application No. 202080062934.1, dated Jun. 15, 2023.

International Search Report in corresponding/related International Application No. PCT/IB2020/057120, date of mailing Oct. 9, 2020.

Written Opinion of the International Searching Authority in corresponding/related International Application No. PCT/IB2020/057120, date of mailing Oct. 9, 2020.

First Substantive Examination Report in corresponding/related Saudi Arabian Application No. 522431560, dated Oct. 3, 2024.

* cited by examiner

| Catalysts | SiC Particle size (nm) | Kaolin (wt.%) | Amount of ZSM-5 (wt.%) | Amount of FAU (wt.%) | Binder (wt.%) | SiC (wt.%) |
|---|---|---|---|---|---|---|
| Cat-0 | - | 60 | 20 | - | 20 | - |
| Cat-1 | 80 nm | 55 | 18 | - | 18 | 9 |
| Cat-2 | 800 nm | 55 | 18 | - | 18 | 9 |
| Cat-3 | 800 nm | 50 | 17 | - | 17 | 17 |
| Cat-4 | 37 um | 50 | 17 | - | 17 | 17 |
| Cat-5 | 800 nm | 46 | 15 | - | 15 | 23 |
| Cat-6 | 800 nm | 20 | 20 | 20 | 20 | 20 |

FIG. 3

|  | SiC | TiC | WC |
|---|---|---|---|
| Density (g/cm3) | 3.2 | 4.9 | 15.8 |
| Thermal conductivity W/(m-k) | ~114 @RT ~35.7 @1000°C | ~18-31 @RT ~6 @1000°C | ~84.02 @RT |
| Thermal expansion (/K) | 5.5*10-6 (up to 2100 K) | 9.5*10-6 from (up to 3000 K) | 5.5*10-6 (up to 1300 K) |
| Price (www.us-nano.com) | 800 nm $395/1kg | 800 nm $595/1kg | 400 nm $588/1kg |

FIG. 10

| Reaction conditions | value |
| --- | --- |
| Catalyst | CAT-6 |
| Catalyst Loading (g) | 5 |
| Temperature (°C) | 550 |
| Flowrate of water (ml/min) | 0.25 |
| Flowrate of AL (ml/min) | 0.25 |
| Flowrate of $N_2$ (ml/min) | 400 |
| TOS (min) | 116 |

FIG. 12

METAL CARBIDE BASED CATALYST AND METHOD OF MAKING

CROSS-REFERENCE TO RELATED APPLICATIONS

This application is a U.S. National Stage Application of International Application No. PCT/IB2020/057120, filed on Jul. 28, 2020, which claims priority to U.S. Provisional Patent Application No. 62/881,553, filed on Aug. 1, 2019, entitled "SILICON CARBIDE AS ADDITIVE IN THE MANUFACTURE OF SPRAY DRIED CATALYSTS," the disclosures of which are incorporated herein by reference in their entirety.

BACKGROUND

Technical Field

Embodiments of the subject matter disclosed herein generally relate to a catalyst and a method for making the catalyst, and more particularly, to a metal carbide based catalyst that is formed via spray drying.

Discussion of the Background

Fluid catalytic cracking (FCC) is one of the most used conversion processes employed in petroleum refineries. It is widely used to convert the high-boiling, high-molecular weight hydrocarbon fractions of petroleum crude oils into more valuable gasoline, olefinic gases, and other products. Cracking of petroleum hydrocarbons by catalytic cracking produces more gasoline with a higher octane rating. It also produces byproduct gases that have more carbon-carbon double bonds (i.e., more olefins), and hence more economic value, than those produced by thermal cracking.

The feedstock to FCC is usually that portion of the crude oil that has an initial boiling point of 340° C. (644° F.) or higher at atmospheric pressure and an average molecular weight ranging from about 200 to 600 or higher. This portion of the crude oil is often referred to as heavy gas oil or vacuum gas oil (HVGO). In the FCC process, the feedstock is heated to a high temperature and moderate pressure, and brought into contact with a hot, powdered catalyst. The catalyst breaks the long-chain molecules of the high-boiling hydrocarbon liquids into much shorter molecules, which are then collected as a vapor.

During such oil refining processes, one widely used catalyst is the zeolitic material, that breaks down complex and long-chain hydrocarbons into simple, useful hydrocarbons. However, over longer periods of time, there is significant loss in the activity of the catalyst and it can no longer function properly. The inhibitions in catalytic performance are accounted by different factors such as physical losses, steam, high temperature, time, coke formation and poisoning from metal contaminants in the feedstock. This type of deactivated catalyst is referred to as "used or spent" catalyst or equilibrium catalyst or simply "E-cat".

In the FCC processes, the equilibrium catalyst is a physical mixture of varying proportions of fresh catalyst and regenerated catalyst or aged catalyst, circulating within the FCC column. The equilibrium catalyst withdrawn as catalytically less active is spent catalyst and gets replaced with an equivalent amount of fresh catalyst. Spent FCC catalysts have low flammability and toxicity as compared to spent hydroprocessing catalysts, however they are not of benign nature and there is a risk of leaching their components. Whereas, in hydroprocessing, the equilibrium catalyst or spent catalyst is entirely replaced with fresh catalyst upon loss in the catalyst activity.

Various formulae have been proposed in the art for obtaining a better catalyst that lasts longer, is not damaging to the environment, has a high density, high thermal conductivity, low thermal expansion, and thermal shock resistance. However, the existing catalysts still suffer from one or more problems associated with the issues discussed above. Thus, there is a need for a new catalyst that can overcome one or more of the problems discussed above.

BRIEF SUMMARY OF THE INVENTION

According to an embodiment, there is a method for making a metal carbide based catalyst for crude oil cracking. The method includes mixing a clay with a phosphorous based stabilizer material to obtain a liquid slurry; adding an aluminosilicate zeolite and an ultrastable Y zeolite to the liquid slurry; adding $Al_2Cl(OH)_5$ to the liquid slurry; adding metal carbide particles, having a given diameter, to the liquid slurry to obtain a mixture; and spray drying the mixture to obtain the metal carbide based catalyst. The metal carbide particles are coated with the aluminosilicate zeolite and the ultrastable Y zeolite.

According to another embodiment, there is a metal carbide based catalyst for crude oil cracking, and the catalyst includes Kaolin clay; a phosphorous based stabilizer material; an aluminosilicate zeolite material; an ultrastable Y zeolite (USY) material; and metal carbide particles having a given diameter. The metal carbide particles are coated with the aluminosilicate zeolite and the USY zeolite materials.

According to still another embodiment, there is a method for cracking crude with a metal carbide based catalyst, and the method includes placing a porous substrate inside a reactor; placing the metal carbide based catalyst over the porous substrate; passing the crude over the metal carbide based catalyst to crack the crude; and collecting at an output of the reactor a cracked gas.

BRIEF DESCRIPTION OF THE DRAWINGS

For a more complete understanding of the present invention, reference is now made to the following descriptions taken in conjunction with the accompanying drawings, in which:

FIG. 3 is a table illustrating metal carbide based catalysts having various amounts of the metal carbide;

FIG. 10 illustrates physical characteristics of different metal carbides which can be used for catalysts preparation;

FIG. 12 illustrates various conditions that are applied to the cracking reactor in FIG. 11 for cracking the crude oil;

DETAILED DESCRIPTION OF THE INVENTION

Figure 1:
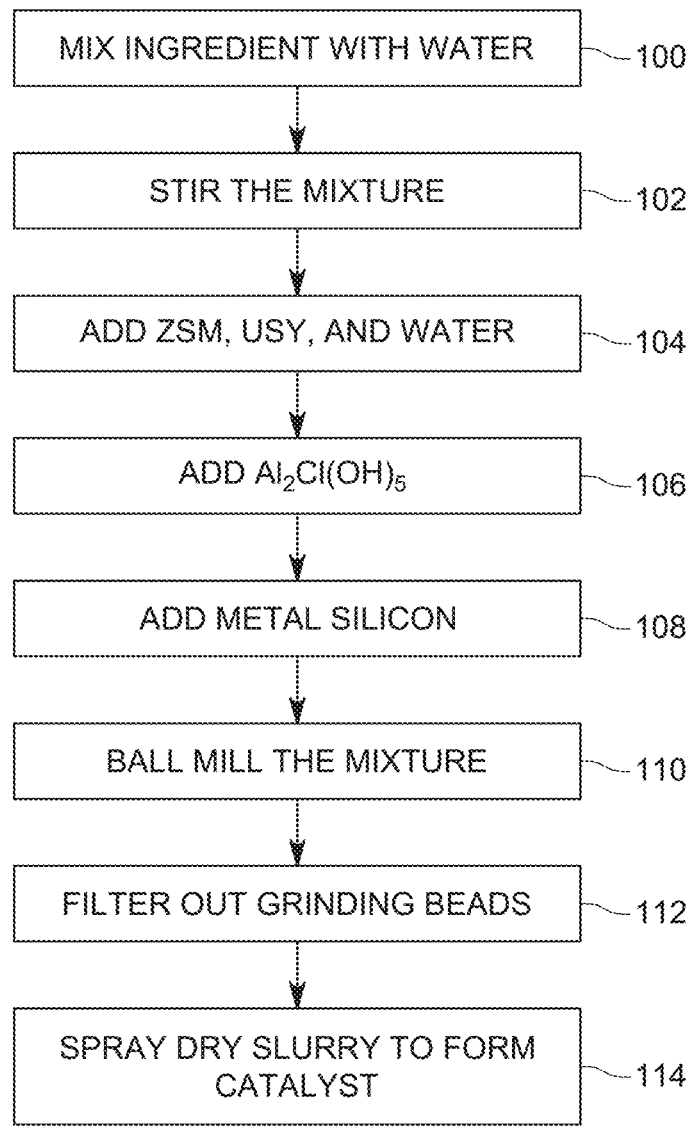
FIG. 1 is a flow chart of a method for making a metal carbide based catalyst for cracking.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a catalyst that includes silicon carbide as an additive and the catalyst particles are manufactured through a spray dried method. However, the embodiments to be discussed next are not limited to silicon carbide, but may be applied to other carbide materials.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel formulation of a technical catalyst is obtained via spray drying metal carbide, e.g., silicon carbide SiC, titanium carbide TiC, tungsten carbide WC, mixed with one or more conventional catalysts. The metal carbide particles display numerous physical and mechanical properties that make them attractive for industrial applications. Because of their high thermal conductivity, high density, and high resistance, the metal carbide particles are attractive additives for the formulation of the new catalyst. Inert, nonporous SiC particles of different sizes are commonly used as a diluent in catalytic beds, mainly for the thermal conductivity of the catalyst bed.

In one embodiment, the incorporation of metal carbide particles in the catalyst body is achieved by spray drying slurries containing the metal carbide particles in the range of 1 to 1000 nm. The addition of metal carbides to the slurry allows for a particle size enhancement by 50% and an increase in the catalyst density by 20%, improving in this way not only the heat transport, but also the fluidization properties of such catalyst. Such designed metal carbide incorporated catalysts have the advantage to display low thermal expansion and excellent thermal shock resistance, properties that usually positively affect the integrity and shape of the catalyst. The new features of these metal-carbide incorporated catalysts have been investigated through advanced solid-state methods that use scanning electron microscope (SEM), N2-physisorption, X-ray diffraction (XRD), and inductively couple plasma (ICP). In one application, the attrition index (AI) of the final catalyst is not affected by the presence of the metal carbide. These features of this novel catalyst are discussed later in more detail.

The novel catalyst may be prepared as now discussed. In this embodiment, the novel catalyst includes, in terms of percentage by weight, 20% ($NH_4^+$-Zeolite Socony Mobil-5 (ZSM-5), which is an aluminosilicate zeolite belonging to the pentasil family of zeolites), 20% ($H^+$-ultrastable Y zeolite (USY, Faujasite (FAU)), 20% (Kaolin), 20% ($Al_2O_3$), and 20% (SiC particles). However, the novel catalyst may include only one of the $NH_4^+$-ZSM-5 or $H^+$-USY catalysts.

The ingredients for obtaining this catalyst include (1) $NH_4^+$-ZSM-5 having a content of $SiO_2:Al_2O_3$ molar ratio of 23 (SAR 23) and a surface area of about 400 $m^2/g$, (2) $H^+$-USY having a content of $SiO_2:Al_2O_3$ molar ratio of 30 (SAR 30) and a surface area of about 780 $m^2/g$, (3) Kaolin clay having a surface area of about 21 $m^2/g$, (4) phosphorous stabilizers: $(NH_4)_2HPO_4$ and $(NaPO_3)_6$, and (5) silicon carbide particles having a particle size of about 800 nm. Those skilled in the art would understand that the novel catalyst can be obtained with the ingredients noted above even if their surface area or particle size deviates from the specific numbers listed above. These specific numbers were provided for indicating one specific implementation, but other similar implementations would also work. In addition, the following materials are also used for manufacturing the catalyst: aluminum chlorohydrate as a binder, zirconium oxide beads for grinding, where the beads have a diameter of about 2 mm, and deionized water.

In one embodiment, as illustrated in FIG. 1, the following method is followed to obtain the metal carbide based catalyst. The method provides specific numbers for obtaining 1 kg of the dry catalyst. These numbers may be scaled up or down depending on the desired final amount of the catalyst. One skilled in the art would also understand that these numbers are exemplary, and a working catalyst may be obtained even if one or more of these numbers are changed, up or down, by up to 20% of the listed quantities. Thus, when the term "about" or "substantially" is used herein, one should understand that term to mean the quantity listed below up to +1-20% of that quantity.

The method starts in step 100 by slowly adding 200 g of distilled water to a solid mixture of 200 g of Kaolin clay, 2 g of $(NH_4)_2HPO_4$ and 3 g of $(NaPO_3)_6$. Then, in step 102, the mixture is stirred, for example, with the help of a mechanical stirrer, until a liquid slurry is formed. When the slurry turns into a homogeneous liquid, 200 g of $NH_4$-ZSM-5 ($SiO_2:Al_2O_3$ molar ratio of 23), 200 g of $H^+$-USY ($SiO_2:Al_2O_3$ molar ratio of 30) and 284 g of distilled water are admixed in step 104 into the slurry and mechanically mixed until homogeneous. After a few minutes of stirring, 841 g of 41 wt. % solution of $Al_2Cl(OH)_5$ is added to the slurry in step 106. The clear 41 wt. % solution of $Al_2Cl(OH)_5$ is prepared separately, by dissolving 344 g of crystalline $Al_2Cl(OH)_5$ in 641 g of distilled water under continuous stirring. It should be noted that the dissolution may take a few hours until it forms a transparent solution. Then, in step 108, after the 41 wt. % solution of $Al_2Cl(OH)_5$ was added, 200 g of powdered SiC (800 nm) is combined with the slurry from the previous step and this mixture is ball milled in step 110 with 300 g of zirconium oxide beads (diameter of 2 mm) at 300 rpm for 30 min. Once the ball milling homogenization is completed, the grinding beads are separated in step 112 from the slurry, by filtration, for example, through a 25 mesh strainer.

Figure 2:
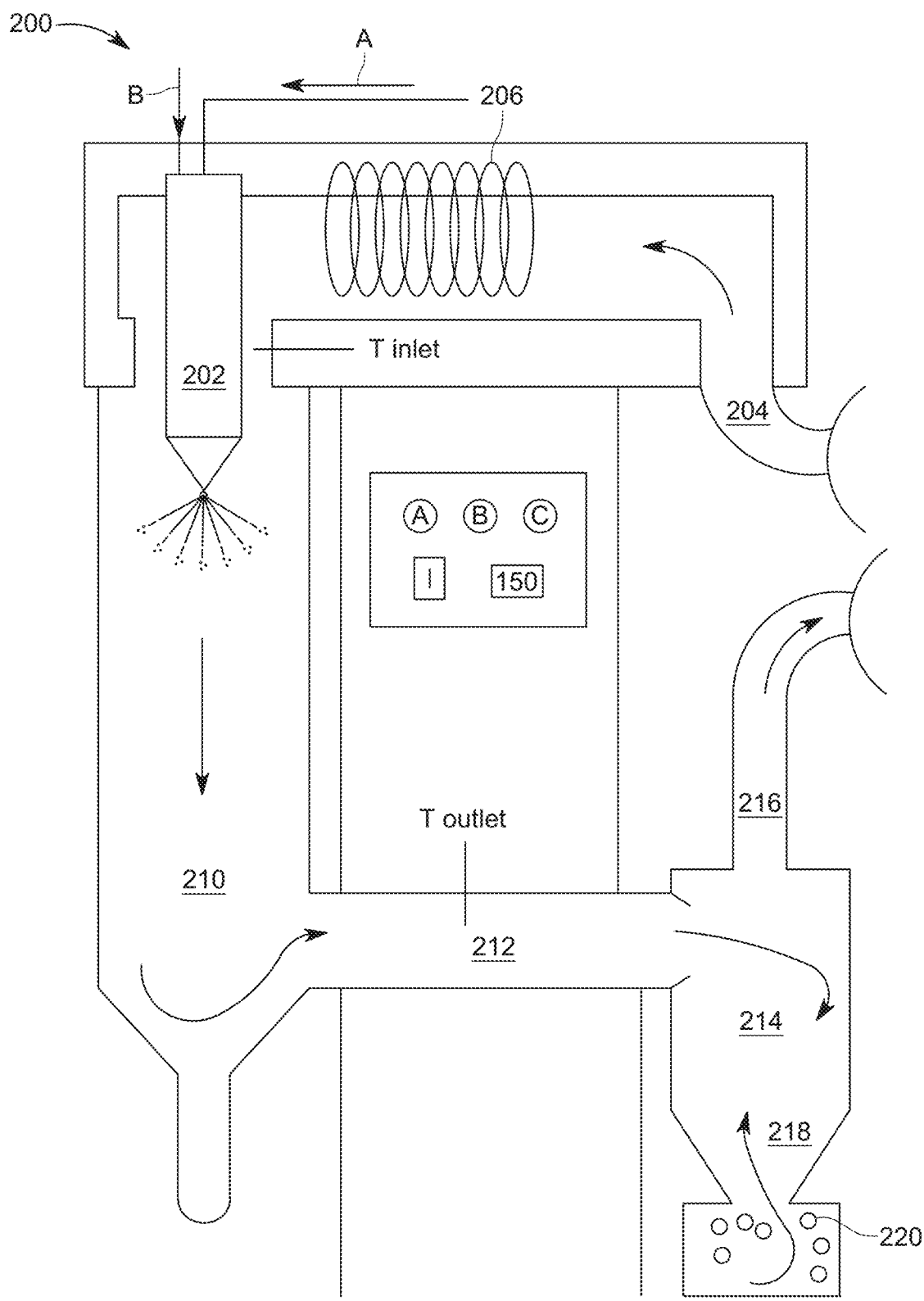
FIG. 2 illustrates a spray drying system used for generating the metal carbide based catalyst.

The slurry formulation is then spray dried in step 114 to obtain the novel catalyst. The step 114 of spray drying may be performed with the device 200 shown in FIG. 2, which takes the mixture A from step 112, and injects it together with an atomization gas B, into a drying chamber 210, through a head 202. A drying gas 204 is provided through a heating element 206 into the head 202. The combination of the mixture A, atomization gas B, and the drying gas 204 are then moved through a pipe 212 to a cyclone 214, where the generated catalyst particles 220 are dried, the drying gas 204 is separated and exhausted at output 216 and the dried particles of the catalyst 220 are collected in a collection vessel 218, at the bottom of the dryer. In one application, the dryer 200 is operated under the following conditions: inlet temperature 220° C., gas velocity 0.7 m$^3$/h, and feed speed 15 mL/min. The slurry should be continuously stirred while the slurries composed of kaolin clay, H-ZSM-5 (SAR 23), SiC powder and binders (Al$_2$Cl(OH)$_5$ were prepared by combining the desired amount of individual components. The SiC particles having various sizes, for example, 80 nm, 800 nm and 37 μm were used in the formulation of various slurries that also include the kaolin clay, ZSM-5 zeolite and binder. Table 1, which is shown in FIG. 3, illustrates the various ratios used for the SiC particles in these catalysts, which are referred to herein as Cat-1 to Cat-6. A catalyst that does not include any SiC particles is referred to as catalyst Cat-0. It is noted in Table 1 that the amount of SiC particles by weight varies between 9 and 23%.

Figure 4:
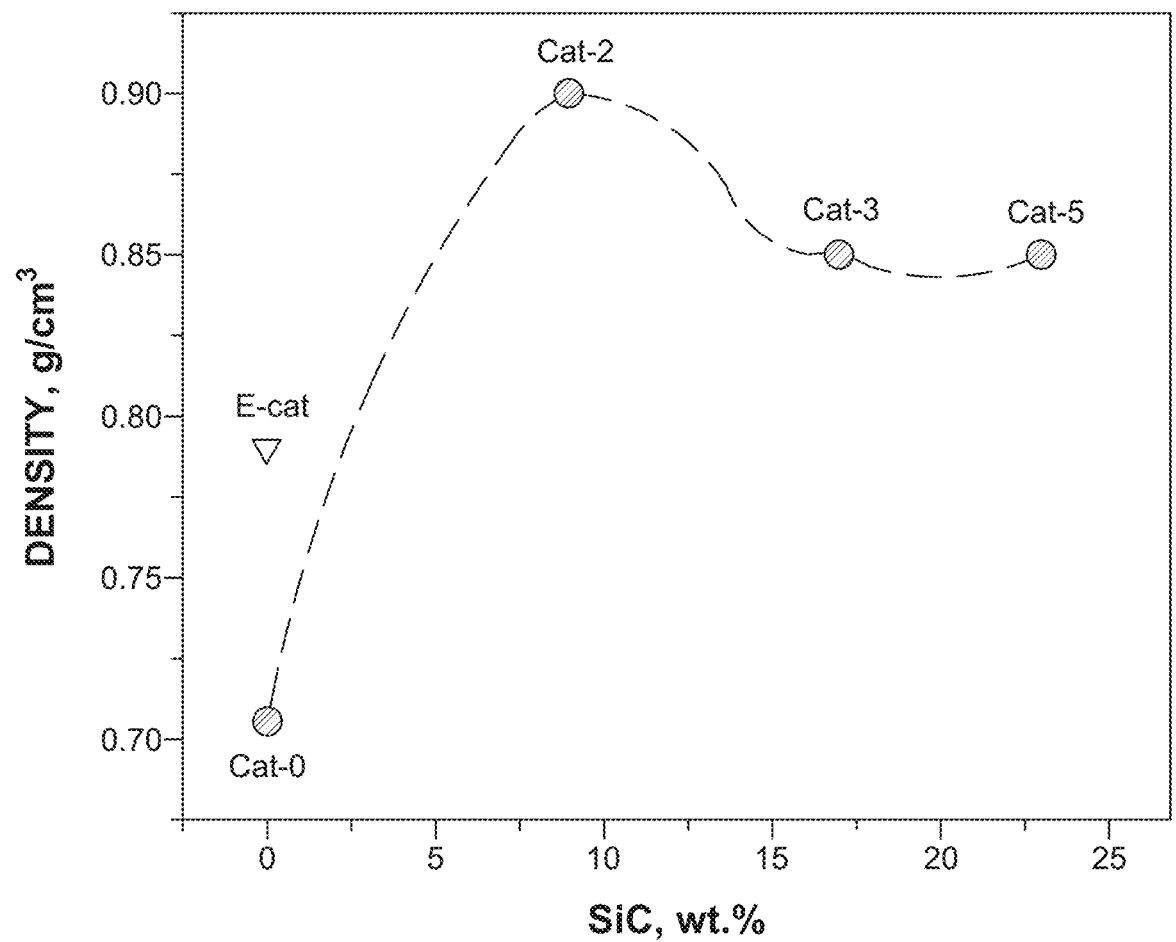
FIG. 4 illustrates the density of various metal carbide based catalysts versus the concentration of the metal carbide particles.

The density of some of the catalysts noted in Table 1 has been determined and plotted in FIG. 4 as a function of the weight percentage of the SiC particles. It is noted that for the catalysts Cat-2, Cat-3, and Cat-5, which have a loading of SiC particles of 9, 17, and 23 wt %, respectively, their density is larger than the density of the commercial E-cat or the density of the catalyst Cat-0, which includes no SiC particles. This is advantageous as the density of the catalyst for the FCC process is desired to be larger than the density of the E-cat.

Figure 5:
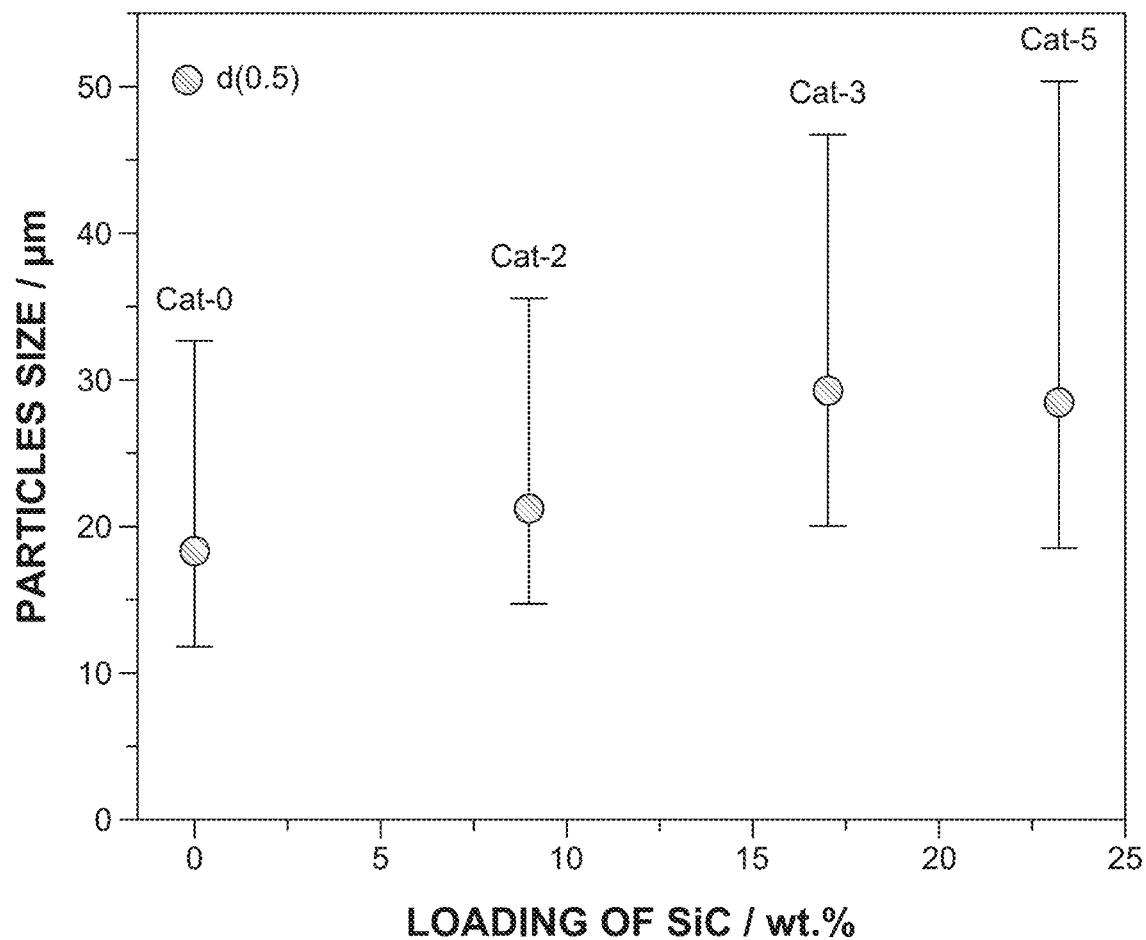
FIG. 5 illustrates the particle size distribution for various metal carbide based catalysts.

The inventors have also investigated the particle size distribution of the catalysts shown in Table 1, and have found that the solid fraction 220 (i.e., the novel catalyst) collected at the bottom collector of the spray dryer 200 and calcined at 700° C. is distributed as shown in FIG. 5. It can be observed in this figure that the addition of metal carbides to the slurry increases the particle size by 50% for the case of Cat-5, which formulation has the highest SiC content (23 wt. %), compared to the catalyst Cat-0, which does not have any SiC particles. FIG. 5 plots the mean particle size variation as a function of the SiC loading. The d(0.5) points in the graph correspond to the respective mass division diameter, where 50% of the sample is smaller and 50% is larger with respect to the average particles size. The particle size ranges are marked with vertical lines for each catalyst in the figure.

Figure 6:
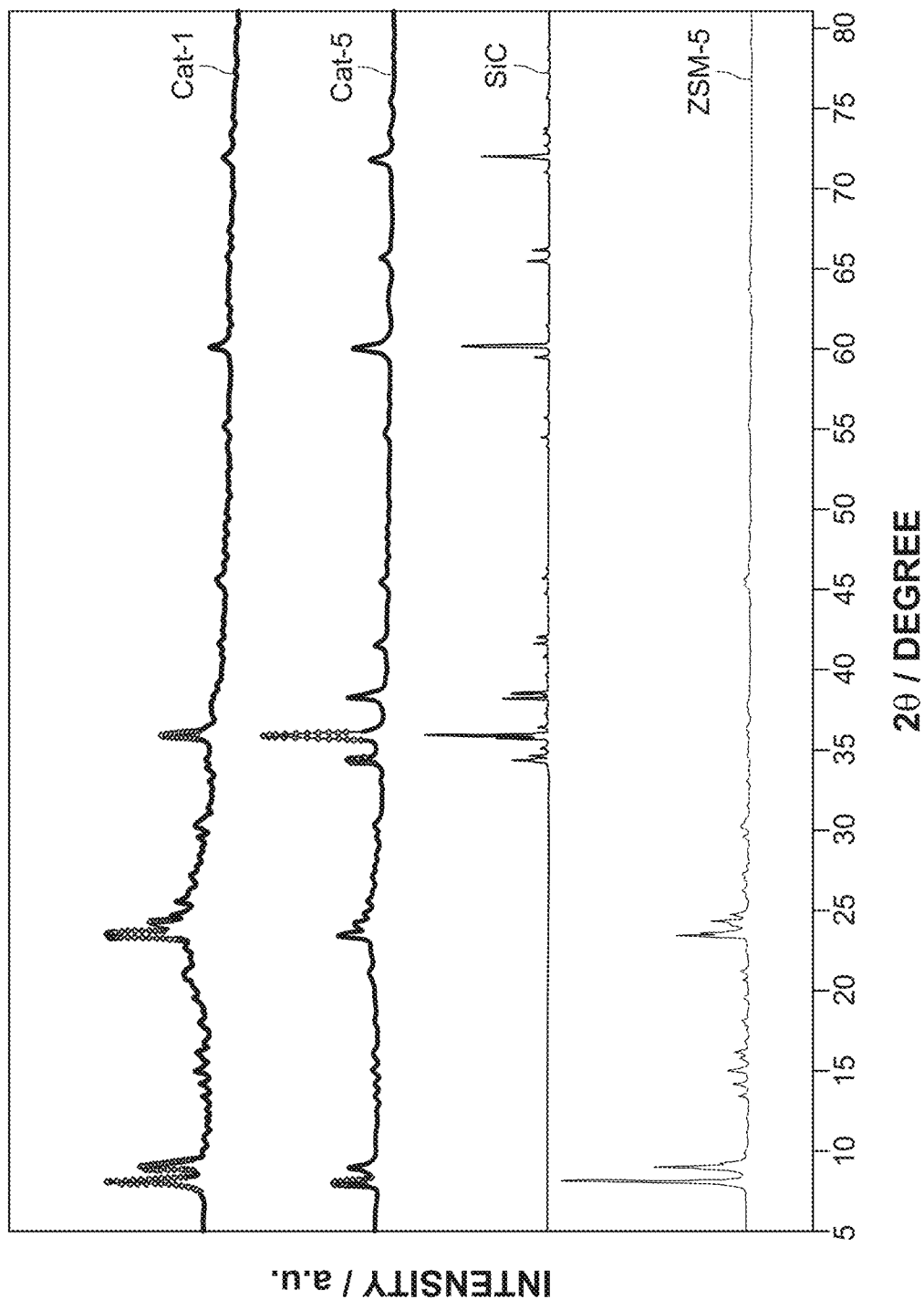
FIG. 6 illustrates the X-ray diffraction pattern for the metal carbide based catalyst when compared to that of a traditional catalyst and pure metal carbide particles.

The X-ray diffraction patterns of the catalysts Cat-1 and Cat-5 is shown in FIG. 6 and they are compared to the XRD patterns of the pure SiC particles and the traditional ZSM-5 catalyst. The Cat-1 and Cat-5 were calcinated at 700° C. prior to being measured. It is noted that the XRD patterns of the two catalysts Cat-1 and Cat-5 show the presence of the SiC particles and also the zeolite material. All peaks in the figure are determined and associated with ZSM-5, SiC and FAU-catalyst diffraction peaks. The lower intensity for the SiC diffraction lines in Cat-1 suggests the smaller particle size of SiC (80 nm) used in this formulation compared to the 800 nm particles incorporated in the Cat-5 catalyst.

Figure 7:
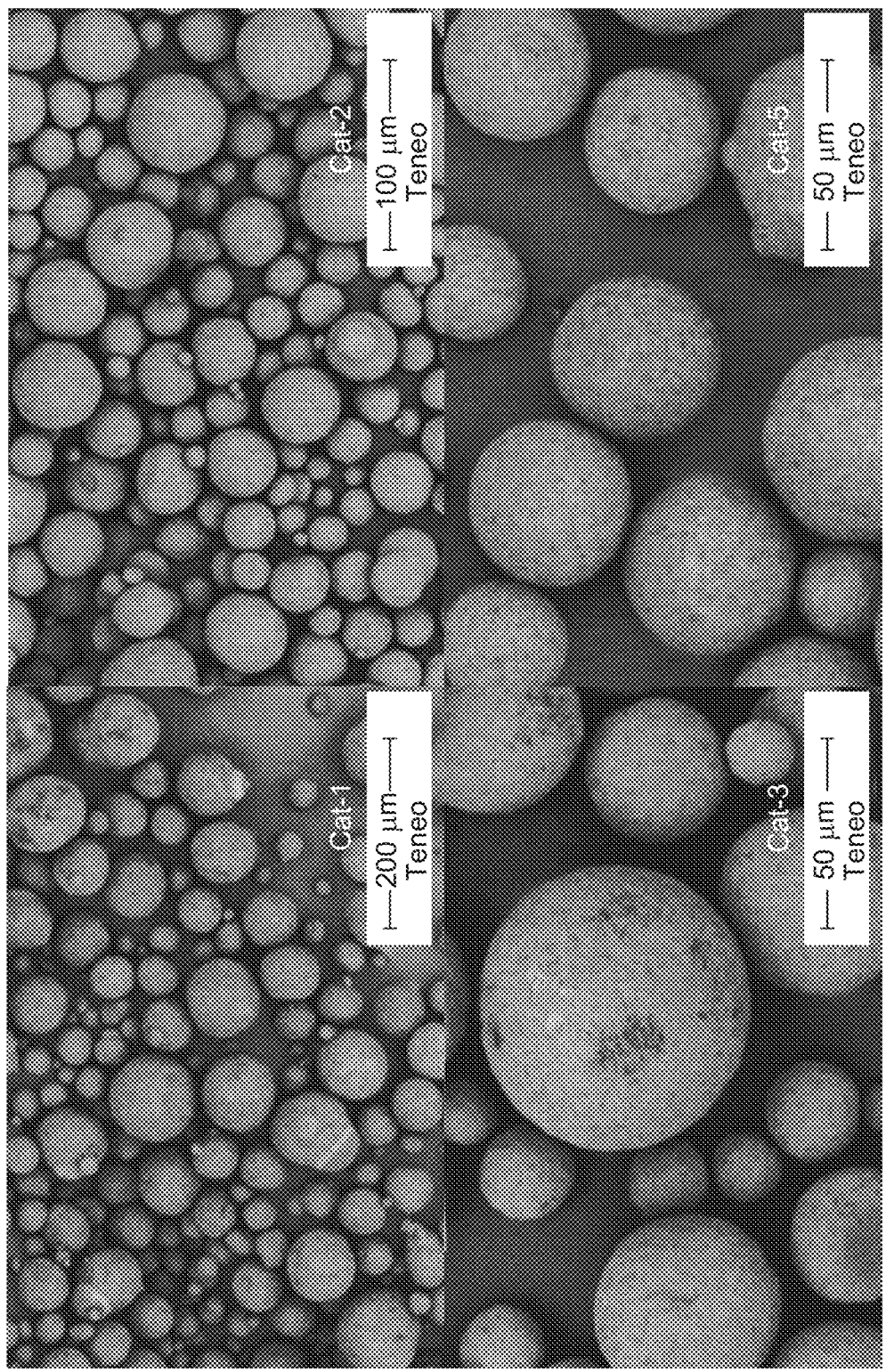
FIG. 7 illustrates various size metal carbide based catalysts by SEM.

Images of the catalyst Cat-1, Cat-2, Cat-3, and Cat-5 were obtained by SEM and are shown in FIG. 7. An attrition test was performed for the Cat-0 and Cat-6 catalysts, and the attrition test is given by the formula $$AI(\%) = \frac{m_f - m_0}{m_s} \cdot 100,$$

where $m_0$ is the mass of the empty fines collection assembly at the start of the test and is measured in grams, $m_f$ is the mass of the fines collection assembly after 20 h, also measured in grams, and $m_s$ is the mass of the sample charged to the apparatus at the beginning the test, also measured in grams. The test was performed at room temperature under fluidization conditions including N$_2$ and air, for 20 h, with a flow of 1.5 l/min for the catalysts Cat-0 and Cat-6. For both catalysts, the results of the tests were 1.7%, which indicate that the new catalyst performs as good as the catalyst without the SiC particles.

It is noted that the particle size in the fine fraction was ranging from 20-71 μm whereas the main/heavier fraction contains particles having a diameter between 38-85 μm. The presence of large enough particles (~70 μm) can be attributed to the low density of some particles because spray drying does not provide 100% homogeneous distribution of components in each particle. Also, the incorporation of SiC, which possesses high strength, could cause the attrition index to grow up as a result of the associated abrasion. However, adding 20 wt. % of SiC with particle diameters of about 800 nm have no effect on the attrition index when compared to the formulation without metal carbide.

Figure 8:
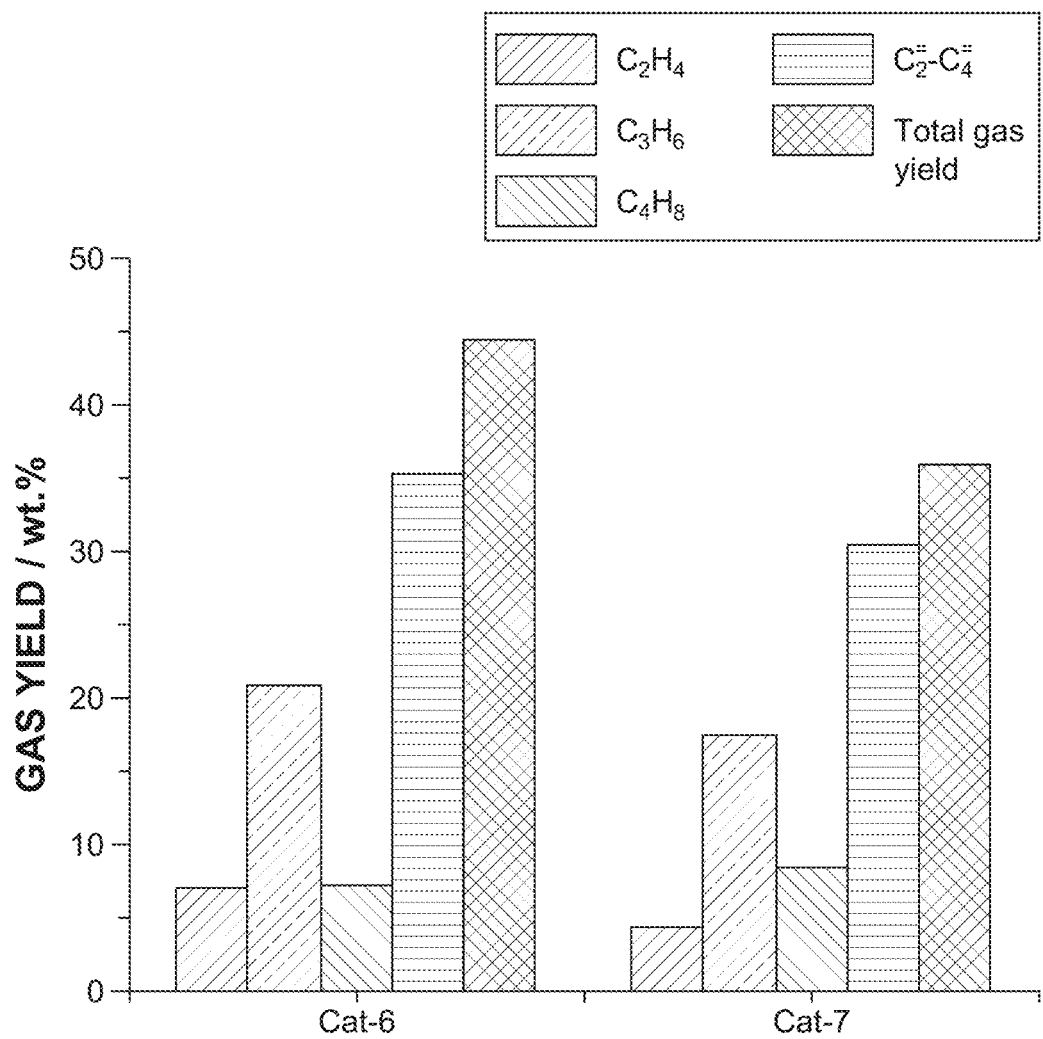
FIG. 8 compares the cracking yield of the metal carbide based catalyst and other traditional catalysts.
Figure 9:
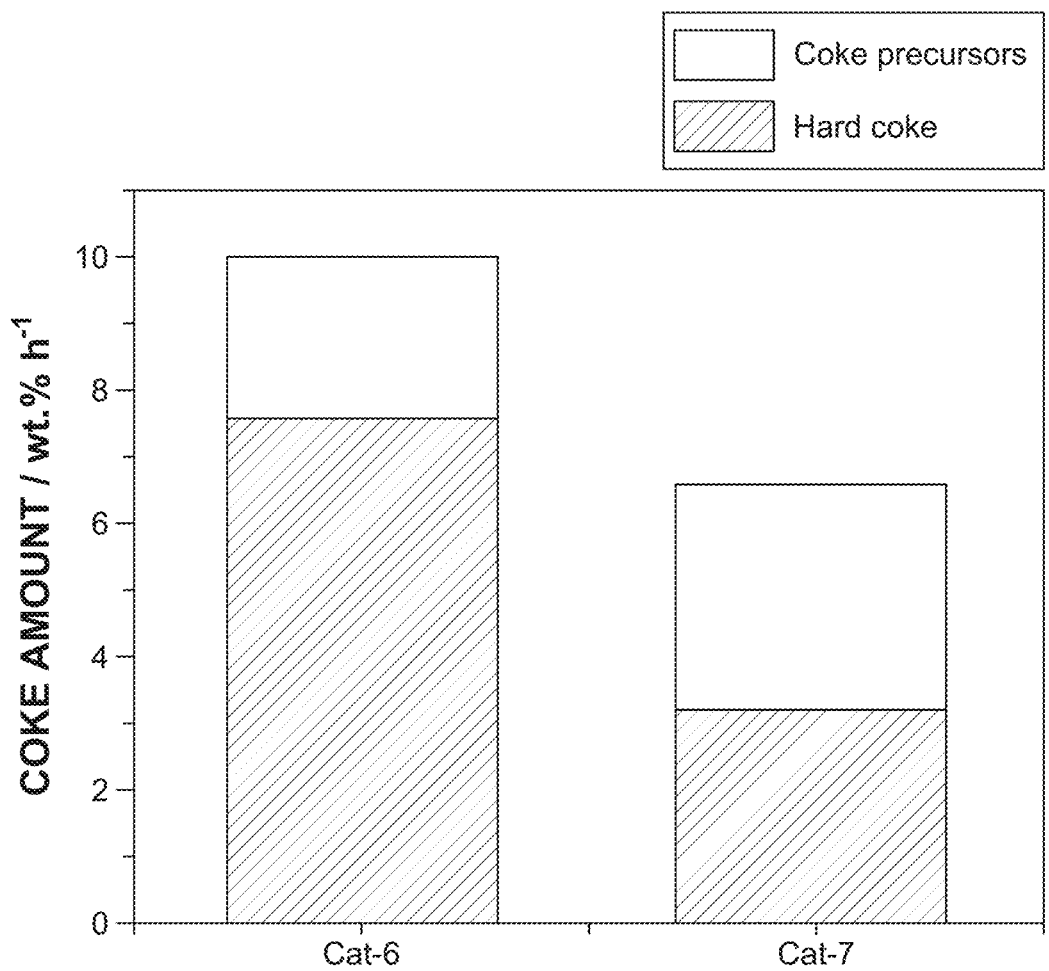
FIG. 9 illustrates the coke deposition on the metal carbide based catalyst when compared with traditional catalysts.

The novel catalyst was also tested under a catalytic test, in which the catalyst was used for Arabian Light (AL) catalytic cracking, which was conducted in a down flow fixed bed reactor, heated by a tubular oven. An AL/water emulsion was feed and mixed inside an ultrasonic bath at 40° C. The gas carrier flow N$_2$ and internal standard Helium (He) were controlled by several mass flow controllers. The total amount of catalyst (5 g) tested in the reaction at T=570° C. was constant to achieve comparable catalyst-to-oil ratios. The FCC with a reaction temperature of about 570° C., a flux of Arabian light of 0.25 ml/min, a flux of water of 0.25 ml/min, a catalyst loading of 5 g, and a gas flowrate of 400 ml/min were performed. The performance of the catalyst with the SiC particles is shown in FIG. 8, and is compared with the performance of a traditional catalyst (called herein Cat-7), that includes Kaolin wt. 45%, ZSM-5 wt. 20%, FAU wt. 20% and a binder wt. 15%. It is noted that the novel catalyst Cat-6 performs better for all but one of the fractions of the oil than the Cat-7 catalyst. When the coke amount for the catalysts noted in FIG. 8 was measured using the thermogravimetric analysis (TGA), it was found that the resulted coke of the spent Cat-6 and Cat-7 catalysts were as illustrated in FIG. 9.

While the above embodiments have been discussed with regard to a catalyst that includes SiC particles, as previously noted, other metal carbide particles may be used. In this regard, Table II in FIG. 10 shows alternatives to the SiC particles, and their characteristics and price. It is noted that the SiC particles are advantageous for their high strength, low thermal expansion, high thermal conductivity, high hardness, excellent thermal shock resistance, and superior chemical inertness.

Figure 11:
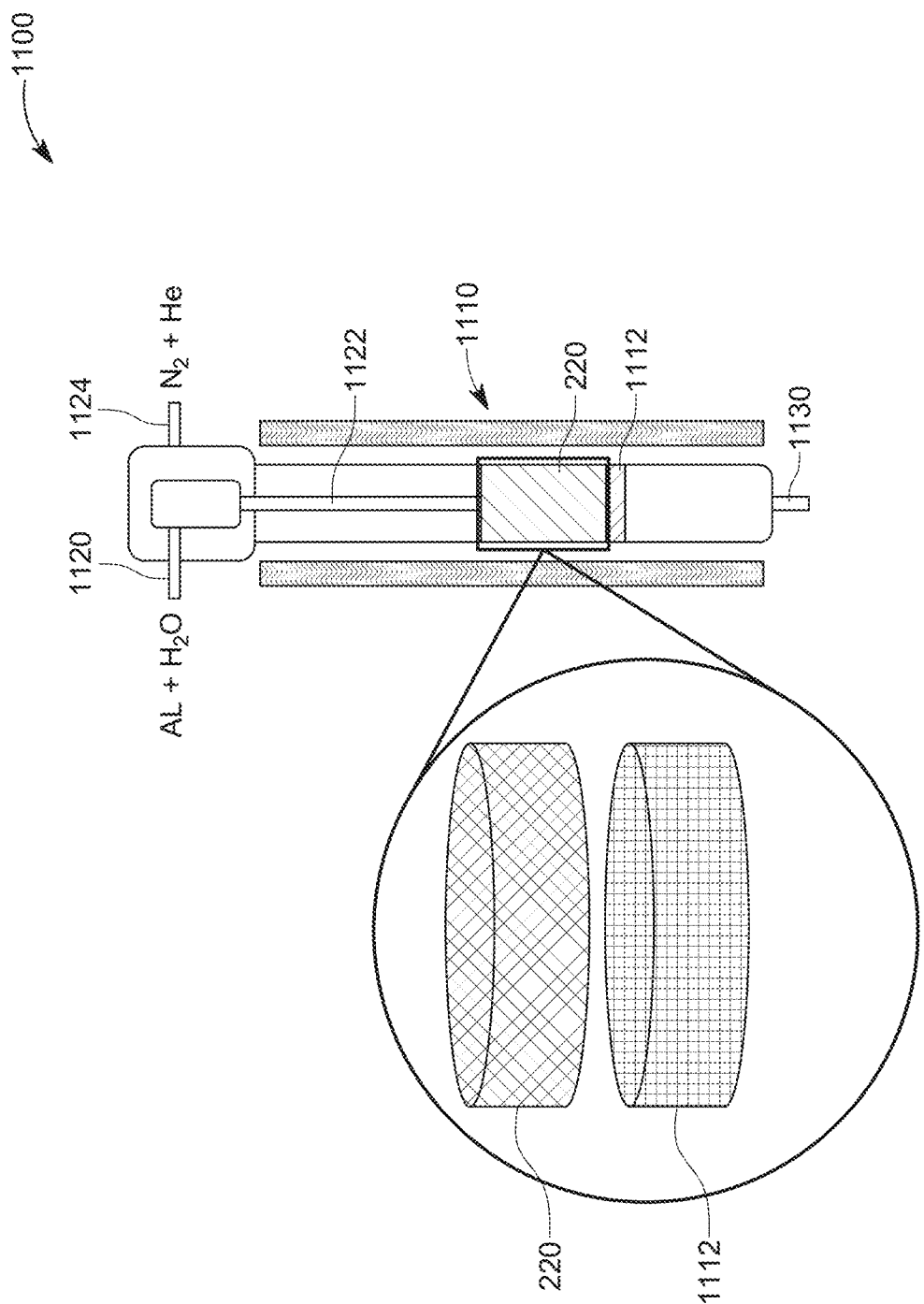
FIG. 11 illustrates a fixed bed cracking reactor that uses the metal carbide based catalyst to crack crude oil.

The catalyst 220 can be used in a fixed bed reactor catalytic cracking system 1100 as now discussed with regard to FIG. 11. Those skilled in the art would understand that the novel catalyst 220 can also be used in a fluidized or transport reactor system, but for simplicity, only the fixed bed reactor system is discussed herein. The fixed bed reactor catalytic system 1100 includes the reactor 1110, which holds inside a support region 1112, for example, made of a porous fritz material. The novel catalyst 220 is placed over the support region 1112. In one application, high-conductivity particles may be placed on top of the support region 1112 for further enhancing the thermal conductivity of the bed. Note that the novel catalyst 220 includes metal carbide particles, but these particles are coated with other elements as discussed in the method illustrated in FIG. 1, while the high-conductivity particles that may be added on top of the support region 1112 are clean particles, i.e., they are not coated with any other chemical component. This assembly is placed inside the reactor 1110, so that gases that are entering into the housing of the reactor have to pass through the catalyst bed. FIG. 11 shows that a combination of AL (or oil derivatives as a naphtha) and $H_2O$ are entered through a first input 1120, and directly delivered to the catalyst 220 through a dedicated pipe 1122, while a combination of $N_2$ and He are delivered through a second input 1124, without mixing them with the AL at the input 1120, to the catalyst 220. The various fractions separated from the crude oil are recovered at the bottom of the reactor, at output 1130. Those skilled in the art would understand that the system 1100 may have other components, e.g., pumps, compressors, collection vessels, heaters for heating the incoming crude, coolers for condensing the obtained gasses, a control system that includes at least a processor and a memory, for controlling the temperatures and flow of the gases, etc. In one embodiment, the conditions inside the system 1100 are as listed in Table III in FIG. 12.

Figure 13A:
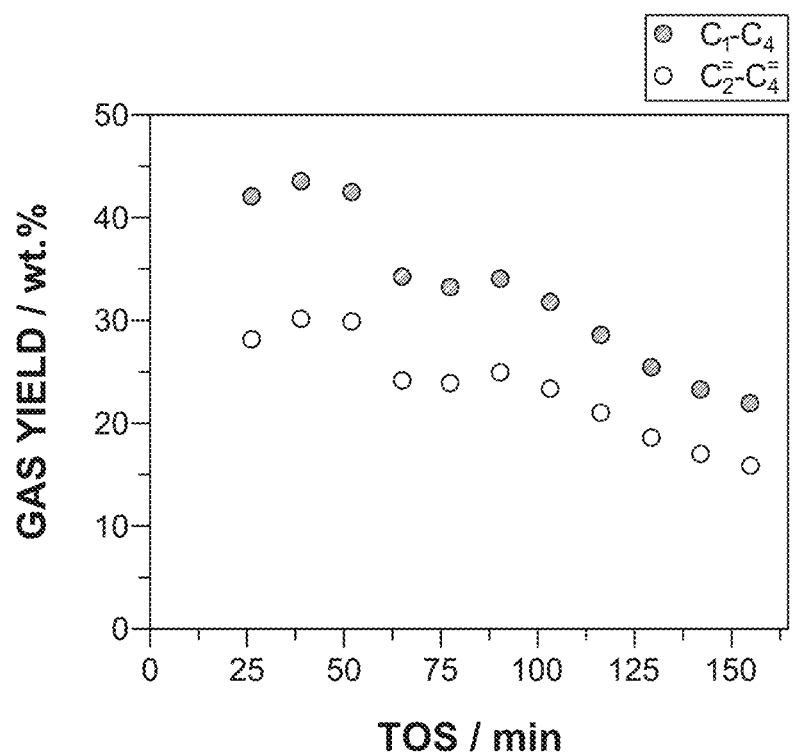
FIGS. 13A to 13D illustrate the various phases obtained from cracking the crude oil in fluidized bed reactor and the associated coke by using the metal carbide based catalyst.
Figure 13B:
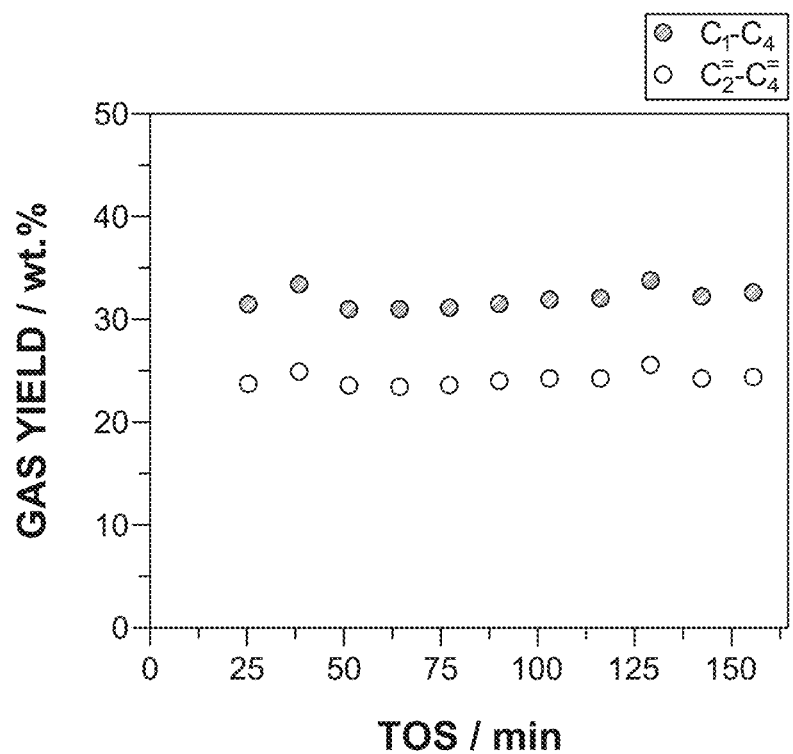
Figure 13C:
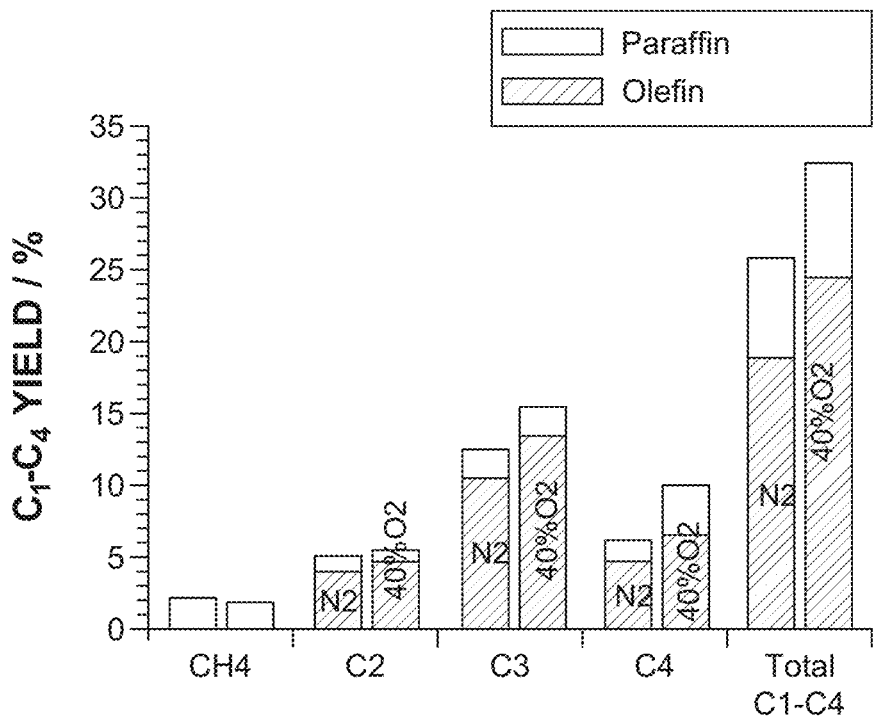
Figure 13D:
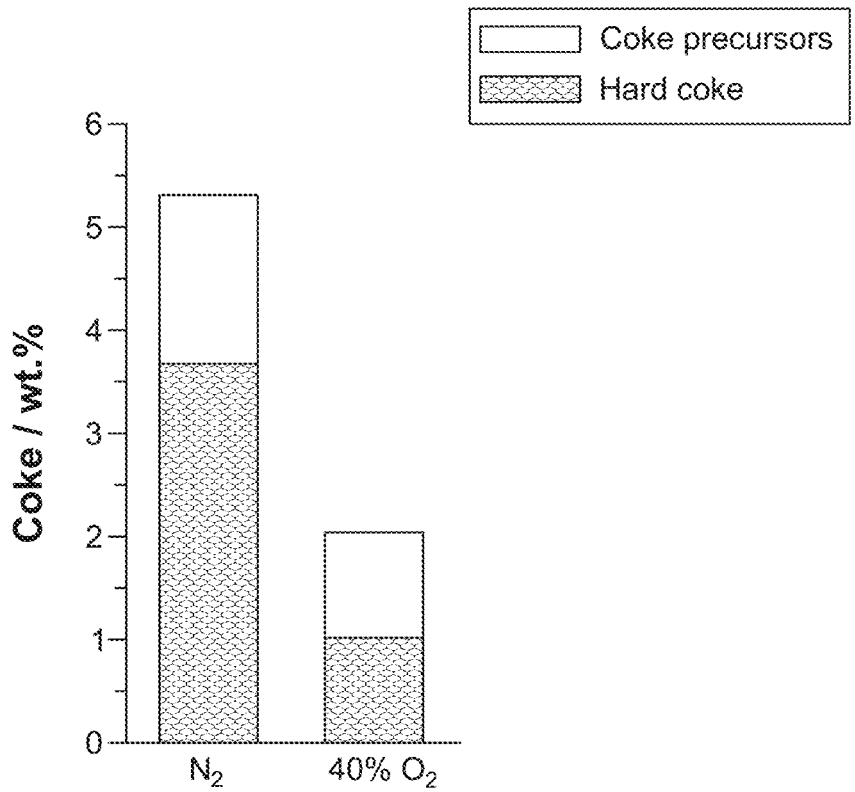

Using a fluidized bed reactor, it is possible to obtain the various fractions shown in FIGS. 13A to 13D. More specifically, the catalytic performance of the novel catalyst 220 in the cracking of Arabian Light at 570° C. using a regenerative stream of nitrogen is shown in FIG. 13A, and the performance under 40% of oxygen is shown in FIG. 13B. The products distribution of the cracking is shown in FIG. 13C, and the coke analysis of the spent catalyst by TGA analysis is shown in FIG. 13D.

The performance of the novel catalyst 220 for the cracking process discussed above reveals a higher activity compared to the commercial E-cat under analogous conditions, showing a total gas yield above 40 wt. % with the light olefins fraction ca. 30 wt. %. The higher $C_3/C_4$ ratio achieved with the novel catalyst 220 formulation is a consequence of an optimal combination of zeolite Y with ZSM-5, the component responsible for light olefins production and isomerization, as evidenced from the higher olefinicity ratios ($C_3''/C_3$ and $C_4''/C_4$) at similar gas yields.

Figure 14:
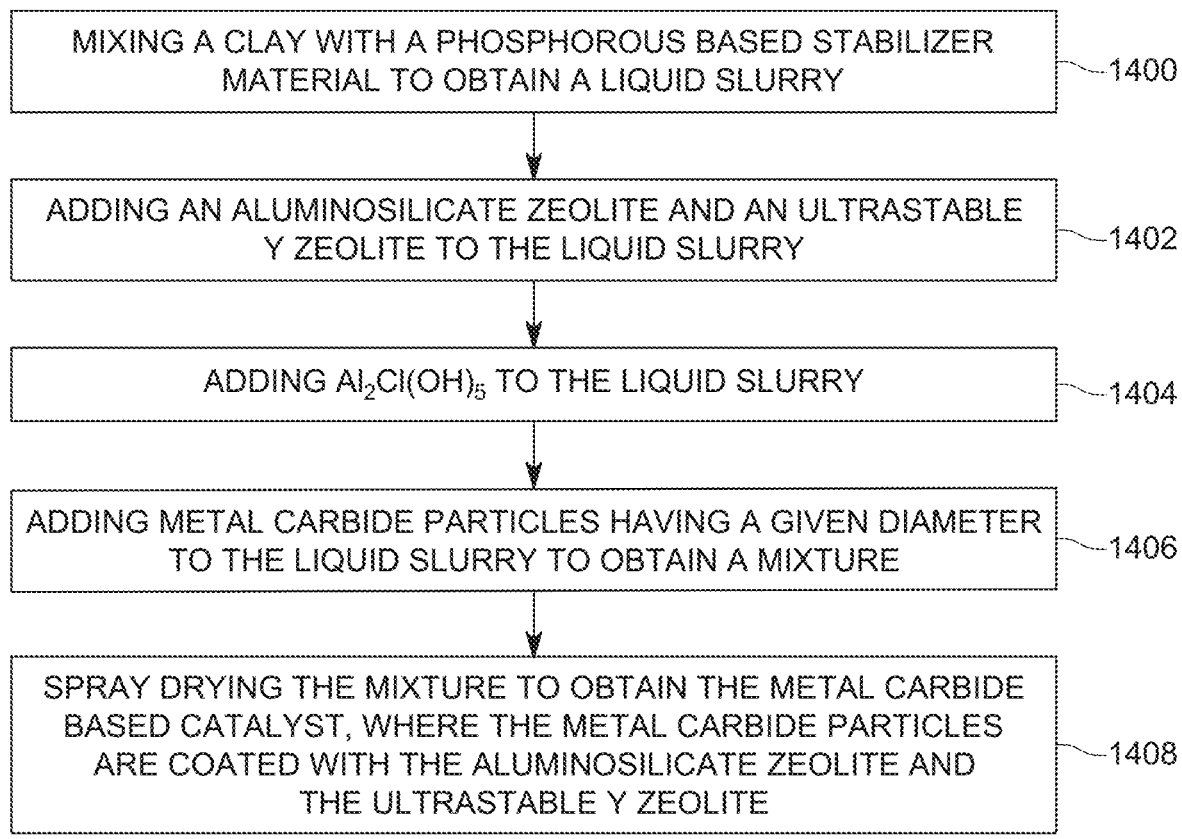
FIG. 14 is a flow chart of a method for making the metal carbide based catalyst.

A method for making the metal carbide based catalyst 220 for crude oil cracking is now discussed with regard to FIG. 14. The method includes a step 1400 of mixing a clay with a phosphorous based stabilizer material to obtain a liquid slurry, a step 1402 of adding an aluminosilicate zeolite and an ultrastable Y zeolite to the liquid slurry, a step 1404 of adding $Al_2Cl(OH)_5$ to the liquid slurry, a step 1406 of adding metal carbide particles having a given diameter to the liquid slurry to obtain a mixture, and a step 1408 of spray drying the mixture to obtain the metal carbide based catalyst. The metal carbide particles are coated with the aluminosilicate zeolite and the ultrastable Y zeolite. In one application, the metal carbide is SiC, or TiC or WC.

The method may further include a step of adding zirconium oxide beads to the liquid slurry, and a step of ball milling the liquid slurry with the zirconium oxide beads. Further, the method may also include a step of separating the zirconium oxide beads from the mixture before the step of ball mixing. In one application, the steps of the method illustrated in FIG. 14 are performed one after another, in the order indicated in the figure. The aluminosilicate zeolite may be the Zeolite Socony Mobil-5 catalyst. The given diameter of the metal carbide particles is between 1 and 1000 nm. The clay may be Kaolin and the phosphorous based stabilized material may include $(NH_4)_2HPO_4$ and $(NaPO_3)_6$.

Figure 15:
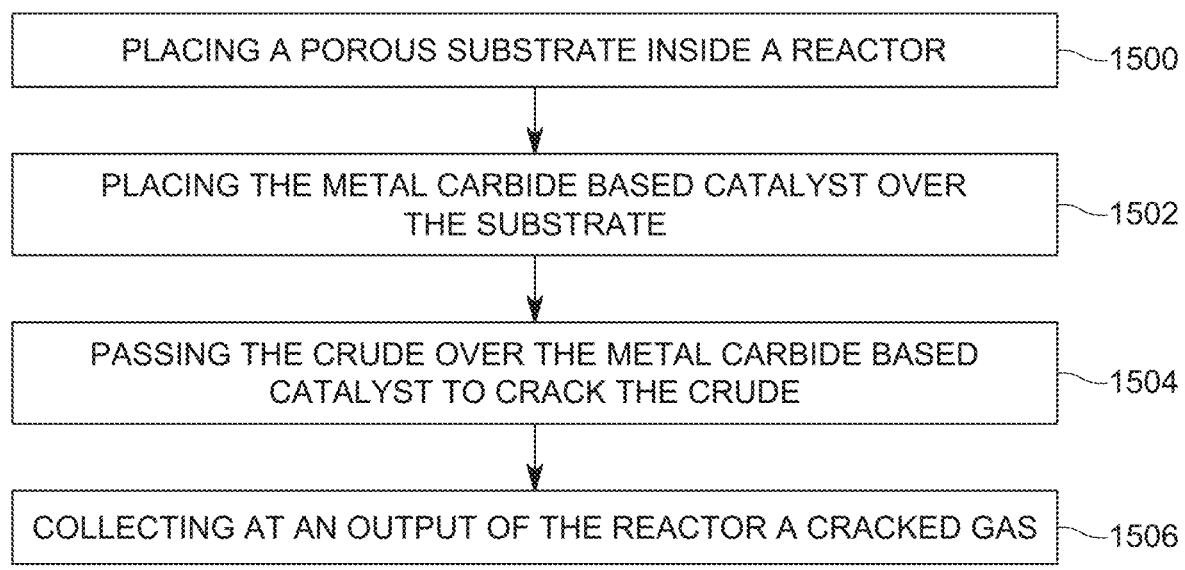
FIG. 15 is a flow chart of a method for using the metal carbide based catalyst into a cracking reactor.

In another embodiment, as illustrated in FIG. 15, there is a method for cracking crude with a metal carbide based catalyst. The method includes a step 1500 of placing a porous substrate 1112 inside a reactor 1100, a step 1502 of placing the metal carbide based catalyst 220 over the porous substrate, a step 1504 of passing the crude over the metal carbide based catalyst 220 to crack the crude, and a step 1506 of collecting at an output 1130 of the reactor 1110 a cracked gas. The metal carbide based catalyst includes Kaolin clay; a phosphorous based stabilizer material; an aluminosilicate zeolite material; an ultrastable Y zeolite (USY) material; and metal carbide particles having a given diameter. The metal carbide particles are coated with the aluminosilicate zeolite and the USY zeolite materials. The metal carbide may be SiC, or TiC or WC. The aluminosilicate zeolite material may be the Zeolite Socony Mobil-5 catalyst. The reactor may be a fixed bed reactor catalytic cracking system.

The disclosed embodiments provide a novel catalyst for crude oil cracking that includes dried spray metal carbide particles mixed with one or more existing catalysts. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for making a metal carbide based catalyst for crude oil cracking, the method comprising:
   mixing a clay with a phosphorous based stabilizer material to obtain a liquid slurry;
   adding an aluminosilicate zeolite and an ultrastable Y zeolite to the liquid slurry;
   adding $Al_2Cl(OH)_5$ to the liquid slurry;
   adding metal carbide particles, having a given diameter, to the liquid slurry to obtain a mixture; and
   spray drying the mixture to obtain the metal carbide based catalyst, wherein the metal carbide particles are coated with the aluminosilicate zeolite and the ultrastable Y zeolite.

2. The method of claim 1, wherein the metal carbide is SiC.

3. The method of claim 1, wherein the metal carbide is TiC.

4. The method of claim 1, wherein the metal carbide is WC.

5. The method of claim 1, further comprising:
adding zirconium oxide beads to the liquid slurry; and
ball milling the liquid slurry with the zirconium oxide beads.

6. The method of claim 5, further comprising:
separating the zirconium oxide beads from the mixture before the step of spray drying.

7. The method of claim 1, wherein the steps are performed one after another.

8. The method of claim 1, wherein the aluminosilicate zeolite is a Zeolite Socony Mobil-5 catalyst.

9. The method of claim 1, wherein the given diameter of the metal carbide particles is between 1 and 1000 nm.

10. The method of claim 1, wherein the clay is Kaolin and the phosphorous based stabilized material is $(NH_4)_2HPO_4$ and $(NaPO_3)_6$.

11. A metal carbide based catalyst for crude oil cracking, the catalyst comprising:
Kaolin clay;
a phosphorous based stabilizer material;
an aluminosilicate zeolite material;
an ultrastable Y zeolite (USY) material; and
metal carbide particles having a given diameter,
wherein the metal carbide particles are coated with the aluminosilicate zeolite and the USY zeolite materials.

12. The catalyst of claim 11, wherein the metal carbide is SiC.

13. The catalyst of claim 11, wherein the metal carbide is TiC.

14. The catalyst of claim 11, wherein the metal carbide is WC.

15. The catalyst of claim 11, wherein the aluminosilicate zeolite material is a Zeolite Socony Mobil-5 catalyst.

16. A method for cracking crude with a metal carbide based catalyst, the method comprising:
placing a porous substrate inside a reactor;
placing the metal carbide based catalyst over the porous substrate;
passing the crude over the metal carbide based catalyst to crack the crude; and
collecting at an output of the reactor a cracked gas.

17. The method of claim 16, wherein the metal carbide based catalyst includes:
Kaolin clay;
a phosphorous based stabilizer material;
an aluminosilicate zeolite material;
an ultrastable Y zeolite (USY) material; and
metal carbide particles having a given diameter,
wherein the metal carbide particles are coated with the aluminosilicate zeolite and the USY zeolite materials.

18. The method of claim 17, wherein the metal carbide is SiC, or TiC or WC.

19. The method of claim 17, wherein the aluminosilicate zeolite material is a Zeolite Socony Mobil-5 catalyst.

20. The method of claim 16, wherein the reactor is a fixed bed reactor catalytic cracking system.

* * * * *